(12) United States Patent
Bennett

(10) Patent No.: US 8,085,020 B1
(45) Date of Patent: Dec. 27, 2011

(54) SWITCHING VOLTAGE REGULATOR EMPLOYING DYNAMIC VOLTAGE SCALING WITH HYSTERETIC COMPARATOR

(75) Inventor: George J. Bennett, Murrieta, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 806 days.

(21) Appl. No.: 12/139,231

(22) Filed: Jun. 13, 2008

(51) Int. Cl.
*G05F 1/00* (2006.01)

(52) U.S. Cl. ........................................ 323/282; 323/283

(58) Field of Classification Search .................. 323/222, 323/223, 225, 268, 271, 282–285, 288; 713/320, 713/340, 401
See application file for complete search history.

(56) References Cited

U.S. PATENT DOCUMENTS

| | | |
|---|---|---|
| 4,164,648 A | 8/1979 | Chu |
| 4,298,898 A | 11/1981 | Cardot |
| 4,675,617 A | 6/1987 | Martin |
| 4,737,670 A | 4/1988 | Chan |
| 4,822,144 A | 4/1989 | Vriens |
| 4,922,141 A | 5/1990 | Lofgren et al. |
| 5,146,121 A | 9/1992 | Searles et al. |
| 5,386,187 A | 1/1995 | Bichler et al. |
| 5,440,250 A | 8/1995 | Albert |
| 5,440,520 A | 8/1995 | Schutz et al. |
| 5,446,718 A | 8/1995 | Shimizu et al. |
| 5,459,438 A | 10/1995 | Mirow |
| 5,479,119 A | 12/1995 | Tice et al. |
| 5,612,610 A | 3/1997 | Borghi et al. |
| 5,629,610 A | 5/1997 | Pedrazzini et al. |
| 5,638,019 A | 6/1997 | Frankeny |
| 5,640,383 A | 6/1997 | Kamoto et al. |
| 5,661,422 A | 8/1997 | Tice et al. |
| 5,717,683 A | 2/1998 | Yoshimoto et al. |
| 5,747,976 A | 5/1998 | Wong et al. |
| 5,748,050 A | 5/1998 | Anderson |
| 5,777,567 A | 7/1998 | Murata et al. |
| 5,787,292 A | 7/1998 | Ottesen et al. |
| 5,808,455 A | 9/1998 | Schwartz et al. |
| 5,815,043 A | 9/1998 | Chow et al. |
| 5,994,885 A | 11/1999 | Wilcox et al. |
| 6,031,426 A | 2/2000 | Yechuri |
| 6,055,287 A | 4/2000 | McEwan |
| 6,125,157 A | 9/2000 | Donnelly et al. |
| 6,157,247 A * | 12/2000 | Abdesselem et al. ......... 327/540 |

(Continued)

FOREIGN PATENT DOCUMENTS

WO     WO 90/13079 A1     11/1990

OTHER PUBLICATIONS

Wei et al., A Variable-Frequency Parallel I/O Interface with Adaptive Power-Supply Regulation, Nov. 2000, IEEE, Journal of Solid-State Circuits vol. 35, No. 11, pp. 1600-1610.*

(Continued)

*Primary Examiner* — Jue Zhang

(57) ABSTRACT

A switching voltage regulator is disclosed operable to regulate a voltage supplied to system circuitry. A comparator compares an oscillator signal generated by a ring oscillator to a reference signal generated by a frequency generator. Switching circuitry charges a charging element in response to the comparison, and control circuitry adjusts a number of delay elements in the ring oscillator and a divider value of the frequency generator to generate hysteresis in the comparison. In one embodiment, the charging element is charged while a frequency of the reference signal is above a frequency of the oscillator signal.

16 Claims, 6 Drawing Sheets

U.S. PATENT DOCUMENTS

| | | | |
|---|---|---|---|
| 6,188,206 B1 | 2/2001 | Nguyen et al. | |
| 6,259,293 B1 | 7/2001 | Hayase et al. | |
| 6,259,327 B1 | 7/2001 | Balistreri et al. | |
| 6,285,263 B1 | 9/2001 | Anderson | |
| 6,288,524 B1 | 9/2001 | Tsujimoto | |
| 6,333,652 B1 | 12/2001 | Iida et al. | |
| 6,356,062 B1 | 3/2002 | Elmhurst et al. | |
| 6,396,251 B2 | 5/2002 | Corva et al. | |
| 6,424,184 B1 | 7/2002 | Yamamoto et al. | |
| 6,425,086 B1 | 7/2002 | Clark et al. | |
| 6,449,110 B1 | 9/2002 | DeGroat et al. | |
| 6,449,575 B2 | 9/2002 | Bausch et al. | |
| 6,515,460 B1 | 2/2003 | Farrenkopf | |
| 6,525,585 B1 | 2/2003 | Iida et al. | |
| 6,535,735 B2 | 3/2003 | Underbrink et al. | |
| 6,577,535 B2 | 6/2003 | Pasternak | |
| 6,617,936 B2 | 9/2003 | Dally et al. | |
| 6,622,252 B1 | 9/2003 | Klaassen et al. | |
| 6,657,467 B2 | 12/2003 | Seki et al. | |
| 6,693,473 B2 | 2/2004 | Alexander et al. | |
| 6,721,255 B1 | 4/2004 | Gushima et al. | |
| 6,774,694 B1 | 8/2004 | Stern et al. | |
| 6,831,494 B1 | 12/2004 | Fu et al. | |
| 6,868,503 B1 | 3/2005 | Maksimovic et al. | |
| 6,870,410 B1 | 3/2005 | Doyle et al. | |
| 6,885,210 B1 | 4/2005 | Suzuki | |
| 6,909,266 B2 | 6/2005 | Kernahan et al. | |
| 6,970,045 B1 | 11/2005 | Lichter et al. | |
| 6,987,380 B1 | 1/2006 | Lee | |
| 7,015,735 B2 | 3/2006 | Kimura et al. | |
| 7,042,202 B2 | 5/2006 | Sutardja et al. | |
| 7,061,292 B2 | 6/2006 | Maksimovic et al. | |
| 7,102,446 B1 | 9/2006 | Lee et al. | |
| 7,109,695 B2 | 9/2006 | King | |
| 7,129,763 B1 | 10/2006 | Bennett et al. | |
| 7,151,417 B1 | 12/2006 | Suzuki | |
| 7,176,663 B2 | 2/2007 | Takimoto et al. | |
| 7,205,805 B1 | 4/2007 | Bennett | |
| 7,259,603 B2 | 8/2007 | Gibson et al. | |
| 7,276,925 B2 | 10/2007 | Dobberpuhl et al. | |
| 7,330,017 B2 | 2/2008 | Dwarakanath et al. | |
| 7,330,019 B1 | 2/2008 | Bennett | |
| 7,437,580 B2* | 10/2008 | Henderson et al. | 713/320 |
| 7,486,060 B1* | 2/2009 | Bennett | 323/282 |
| 7,551,383 B1 | 6/2009 | Kupferman | |
| 7,733,189 B1* | 6/2010 | Bennett | 323/284 |
| 2003/0093160 A1 | 5/2003 | Maksimovic | |
| 2004/0257056 A1 | 12/2004 | Huang | |
| 2005/0099235 A1 | 5/2005 | Sakamoto | |
| 2005/0134391 A1 | 6/2005 | Kimura | |
| 2005/0140418 A1 | 6/2005 | Muniandy | |
| 2005/0218871 A1 | 10/2005 | Kang | |
| 2005/0218877 A1 | 10/2005 | Oswald | |
| 2005/0251700 A1* | 11/2005 | Henderson et al. | 713/401 |
| 2006/0129852 A1 | 6/2006 | Bonola et al. | |
| 2006/0161678 A1 | 7/2006 | Bopardikar et al. | |
| 2006/0176040 A1* | 8/2006 | Kernahan et al. | 323/299 |
| 2006/0220753 A1 | 10/2006 | Boerstler et al. | |
| 2006/0227861 A1* | 10/2006 | Maksimovic et al. | 375/238 |
| 2008/0252280 A1* | 10/2008 | Prodic et al. | 323/283 |

OTHER PUBLICATIONS

Lu Yun, et al., "A Current Steering Logic Based Ring Oscillator for High Stability and Lower Noise Applications", High Density Packaging and Microsystem Integration, 2007. HDP '07, International Symposium on, Jun. 26-28, 2007, pp. 1-3.

Moore, B., et al., "Design of wireless sub-micron characterization system", VLSI Test Symposium, 2004, Proceedings. 22nd IEEE, Apr. 25-29, 2004, pp. 341-346.

Boit et al., Interaction of Laser Beam with Semiconductor Device (IC), Retrieved Jan. 29, 2009 from http://mikro.ee.tu-berlin.de/hlb/emmi/poster_emmi1.pdf.

Wang et al., "Technology Challenges Motivating Adaptive Techniques", Adaptive Techniques for Dynamic Processor Optimization, Spring US, ISSN 1558-9412, 2008, pp. 1-23.

Wei, Gu-Yeon, "Energy-Efficient I/O Interface Design with Adaptive Power-Supply Regulation", a Dissertation Submitted to the Department of Electrical Engineering and the Committee on Graduate Studies of Stanford University, Jun. 2001, retrieved from http://www-vlsi.stanford.edu/papers/gyw_thesis.pdf on Jan. 29, 2009.

Gu-Yeon Wei et al., "A Fully Digital, Energy-Efficient, Adaptive Power-Supply Regulator", IEEE Journal of Solid-State Circuits, vol. 34, No. 4, pp. 520-528, Apr. 1999.

T. D. Burd, et al., "A Dynamic Voltage Scaled Microprocessor System," IEEE Journal of Solid-State Circuits, vol. 35, No. 11, pp. 1571-1580, Nov. 2000.

Anthony John Stratakos, "High-Efficiency Low-Voltage DC-DC Conversion for Portable Applications," pp. 1, 124-129, 177-183, 188-191, Ph.D. Dissertation, University of California, Berkley, Dec. 1998.

Aleksandar Prodic, et al., "Mixed-Signal Simulation of Digitally Controlled Switching Converters," IEEE COMPEL, pp. 100-105, Jun. 2002.

Jinwen Xiao, et al., "A 4-µA Quiescent-Current Dual-Mode Digitally Controlled Buck Converter IC for Cellular Phone Applications," IEEE Journal of Solid-State Circuits, vol. 39, No. 12, pp. 2342-2348, Dec. 2004.

Shamim Choudhury, "Designing a TMS320F280x Based Digitally Controlled DC-DC Switching Power Supply," Texas Instruments Application Report, http://focus.ti.com, spraab3.pdf, pp. 1-16, Jul. 2005.

Marc Fleischmann, "Long Run Power Management, Dynamic Power Management for Crusoe Processors," Transmeta Corporation, pp. 1-18, Jan. 17, 2001.

Alexander Klaiber, "The Technology Behind Crusoe Processors, Low-Power x86-Compatible Processors Implemented with Code Morphing Software," Transmeta Corporation, pp. 1-18, Jan. 2000.

"Applications for White LED Driver in Parallel vs. Series," Analog Integrations Corporation (AIC), AIC1845, AN027, www.analog.com, pp. 1-7, Oct. 2003.

"Power Supply Regulation," printout from Altera website, http://www.altera.com/support/devices/power/regulators/pow-regulators.html, pp. 1-3, Oct. 2006.

* cited by examiner

SWITCHING VOLTAGE REGULATOR EMPLOYING DYNAMIC VOLTAGE SCALING WITH HYSTERETIC COMPARATOR

BACKGROUND

Prior art switching voltage regulators (such as discontinuous buck voltage regulators) may implement dynamic voltage scaling in order to optimize power consumption by using critical path gate speed as the feedback for switching control. Various techniques have been disclosed for measuring the critical path gate speed, including a ring oscillator that generates an oscillator signal with a frequency proportional to the gate speed of the critical path circuit (where the gate speed is inversely proportional to the propagation delay of the critical path circuit). The error between the oscillator frequency and a reference frequency represents the gate speed error used as feedback for switching control. In a discontinuous buck mode voltage regulator, an inductor charge cycle is triggered when the oscillator frequency falls below the reference frequency. Dynamic voltage scaling may be employed in any suitable application, for example, to optimize power consumption of a microprocessor that is configured to operate at different speeds depending on software dynamics, load dynamics, etc.

DETAILED DESCRIPTION OF EMBODIMENTS OF THE INVENTION

Figure 1:
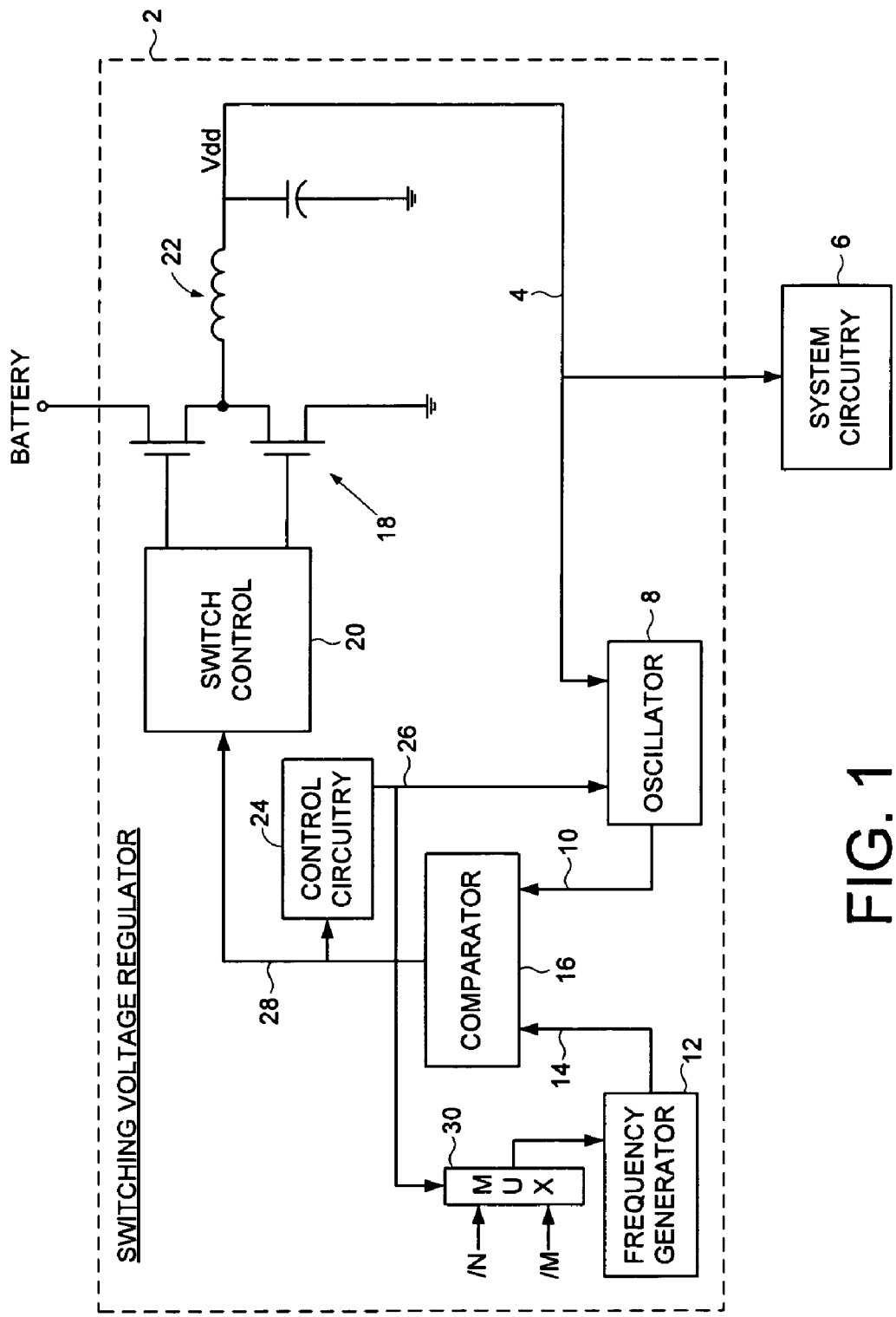
FIG. 1 shows a switching voltage regulator according to an embodiment of the present invention comprising control circuitry for adjusting a frequency of a reference signal and a frequency of a ring oscillator.

FIG. 1 shows a switching voltage regulator 2 operable to regulate a voltage 4 supplied to system circuitry 6. The switching voltage regulator 2 comprises a ring oscillator 8 operable to generate an oscillator signal 10 representing a gate speed of a reference circuit in the system circuitry 6, wherein the ring oscillator 8 comprises a plurality of delay elements connected in series. A frequency generator 12 generates a reference signal 14 representing a target gate speed of the reference circuit, wherein a frequency of the reference signal 14 is based on a divider value. A comparator 16 compares the oscillator signal 10 to the reference signal 14, and switching circuitry 18 (controlled by a switch controller 20) charges a charging element 22 in response to the comparison. Control circuitry 24 adjusts the number of delay elements in the ring oscillator 8 and the divider value of the frequency generator 12 to generate hysteresis in the comparison.

In one embodiment, the control circuitry 24 of FIG. 1 may comprise a flip-flop having an output 26 that changes state each time the output 28 of the comparator 16 changes state. In one embodiment, the output 28 of the comparator 16 goes high each time a frequency of the oscillator signal 10 falls below a frequency of the reference signal 14. The output 26 of the flip-flop 24 configures a multiplexer 30 to toggle between two divider values (N and M), and adjusts the number of delay elements in the ring oscillator 8. The control circuitry 24 may also comprise suitable delay circuitry to accommodate for the timing characteristics of the switching circuitry 18.

Figure 2:
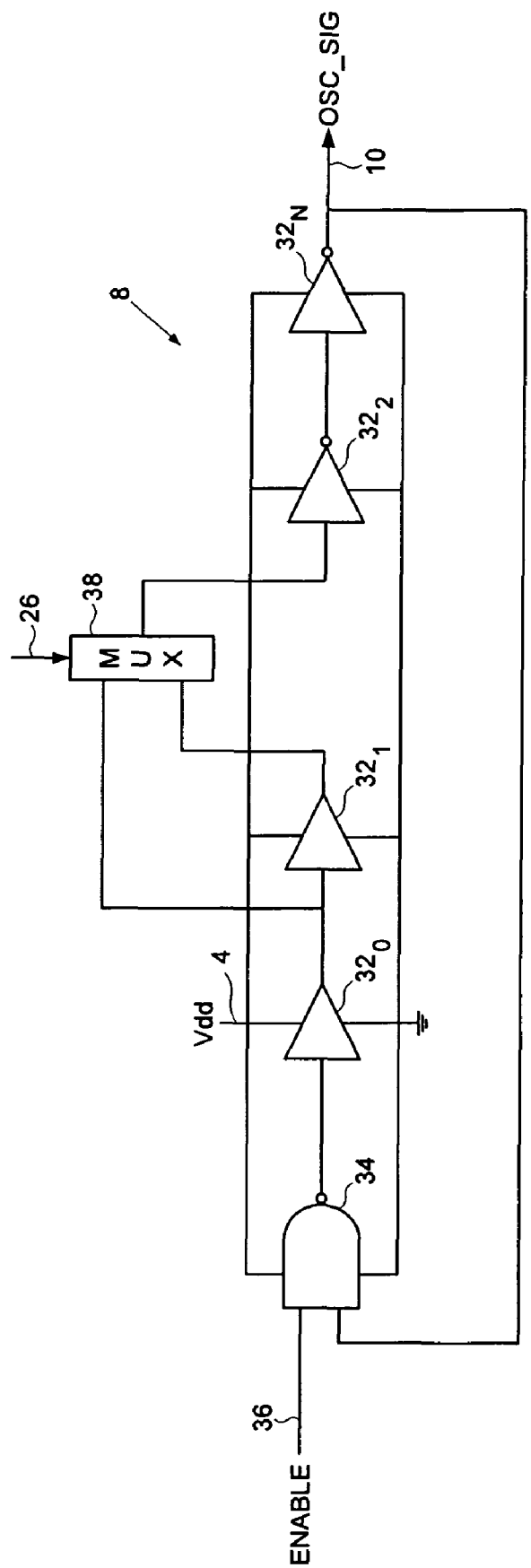
FIG. 2 shows a ring oscillator according to an embodiment of the present invention comprising control circuitry (e.g., a multiplexer) for selecting between a first number of delay elements and a second number of delay elements.

FIG. 2 shows an embodiment of a ring oscillator 8 according to an embodiment of the present invention comprising a plurality of delay elements $32_0$-$32_N$ (including a plurality of inverters) which are powered by the supply voltage 4 generated by the switching voltage regulator 2. The ring oscillator 8 further comprises a NAND gate 34 having as inputs the output of the last delay element $32_N$ and an enable signal 36. When the enable signal 36 is active, the enable signal 36 will propagate through the delay elements $32_0$-$32_N$ and eventually feedback to the NAND gate 34, thereby generating the oscillator signal 10 having a frequency that is proportional to the supply voltage 4. The frequency of the oscillator signal 10 is adjusted by adjusting the number of delay elements $32_0$-$32_N$ connected in series. In the embodiment of FIG. 2, the flip-flop signal 26 controls a multiplexer 38 to selectively remove/insert delay element $32_1$ in order to make a coarse adjustment to the frequency of the oscillator signal 10.

In one embodiment, the coarse adjustment to the frequency of the reference signal 14 (e.g., by changing the divider value between N and M) is slightly different than the coarse adjustment to the frequency of the oscillator signal 10 (e.g., by changing the number of delay elements) so that the result is a fine adjustment to the threshold in comparator 16 (FIG. 1). Toggling between the two adjusted frequencies thereby introduces a hysteresis in the comparator 16 which increases the efficiency by reducing the peak current relative to the normal load current. In one embodiment, the fractional adjustment to the comparison threshold may be computed as:

$$((d-1)/d)*(n/(n-1))$$

where d is the divider value of the frequency generator 12, and n is the number of delay elements in the ring oscillator 8. For example, if d=17 and n=16, the fractional change to the comparison threshold is:

$$16/17*16/15=1.004$$

In one embodiment, employing a coarser granularity for (d,n) reduces noise in the supply voltage 4. For example, selecting d=8 and n=7 may reduce noise in the supply voltage 4 as compared to the above example with d=17 and n=16.

Any suitable charging element (e.g., an inductor, a capacitor, etc.) may be employed in the embodiments of the present invention with any suitable switching voltage regulator configuration. In the embodiment of FIG. 1, a buck mode voltage regulator is shown employing an inductor 22 as the charging element. In other embodiments, the switching voltage regulator may include a boost mode voltage regulator, or a buck/boost mode voltage regulator. In addition, the physical location of the elements comprising the switching voltage regulator is unimportant. For example, in certain embodiments, the ring oscillator 8 may be located on a separate chip from the system circuitry 6. In other embodiments, the inductor 22 may be located separately from digital circuitry comprising portions of the switching voltage regulator. Further-more, the system circuitry 6 may comprise any circuitry supplied by a voltage. In one embodiment, the system circuitry 6 may comprise a microprocessor, as would be typically found in a computer. In another embodiment, the system circuitry 6 may comprise analog circuitry configured to perform one or more tasks.

In one embodiment, the ring oscillator 8 is configurable to represent one of a plurality of different circuits (or circuit paths) within the system circuitry 6 depending on a mode of operation (i.e., the reference circuit may be different circuits at different times). Moreover, the oscillator frequency need not correspond precisely with the gate speed of the reference circuit, but may instead simply track it (e.g., the oscillator frequency may be a multiple of the corresponding gate speed-equivalent frequency of the reference circuit). In a preferred embodiment, the oscillator frequency is directly proportional to the gate speed of the reference circuit. Since the oscillator frequency will vary relative to the magnitude of the supply voltage 4 as well as other factors, such as temperature, adjusting the magnitude of the supply voltage 4 adjusts the frequency of the oscillator signal 10 until the reference circuit is operating at the desired gate speed.

The simulation and layout software used in the design of the system circuitry 6 may provide sophisticated timing analysis of various delays. In one embodiment, the reference circuit within the system circuitry 6 is determined at design time using the simulation and layout software. The gates in the ring oscillator 8 and system circuitry 6 may be fabricated together so they have similar characteristics. Some differences may occur due to loading effects and wire routing; however, by adding inverters, lengthening wires through physical placement, adding dummy loads, and placing the ring oscillator 8 as close as possible to the reference circuit, the ring oscillator 8 may be configured to substantially match the delay of the reference circuit. The ring oscillator 8 will change speed as the temperature changes, as the supply voltage 4 changes, or as the manufacturing process produces faster or slower gates, and thereby track the propagation delay of the reference circuit within the system circuitry 6.

Figure 3:
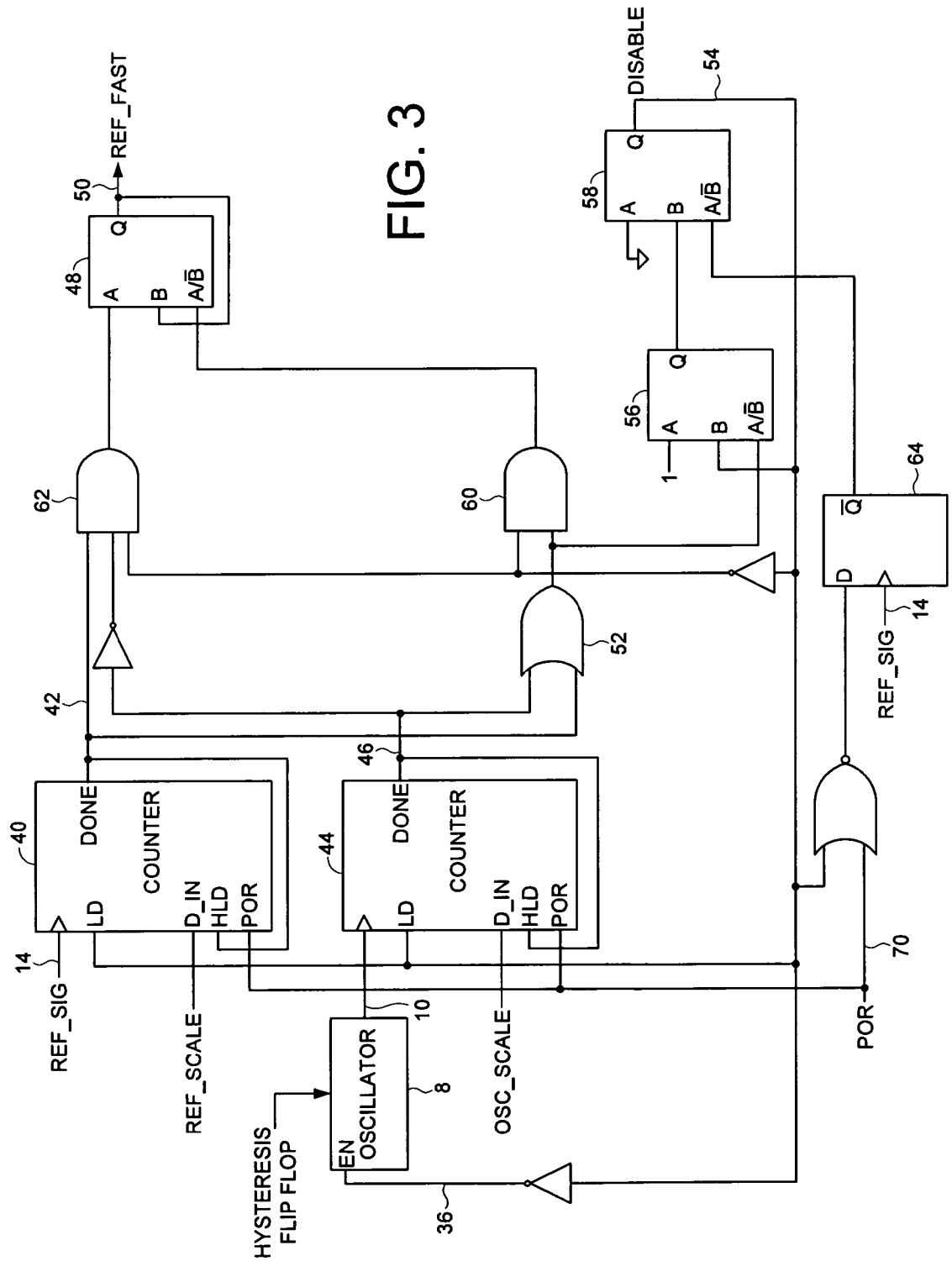
FIG. 3 shows control circuitry according to an embodiment of the present invention for comparing a frequency of the oscillator signal to a frequency of the reference signal.

FIG. 3 shows an example embodiment of the present invention including circuitry for implementing the comparator 16 for comparing at least one cycle of the oscillator signal 10 to at least one cycle of the reference signal 14. The comparator 16 comprises a first register 40 (e.g., a first counter) clocked by the reference signal 14, wherein the first register 40 asserts a first signal 42 at the end of the reference cycle, and a second register 44 (e.g., a second counter) clocked by the oscillator signal 10, wherein the second register 44 asserts a second signal 46 at the end of the oscillator cycle. The comparator 16 further comprises a latch 48 for latching the first signal 42 if generated before the second signal 46. Latch 48 thus outputs a reference fast (REF_FAST) signal 50 indicating when the reference signal 14 is oscillating faster than the oscillator signal 10.

When either the first or second signals 42 or 46 is triggered, an OR gate 52 asserts a disable signal 54 through latches 56 and 58. The disable signal 54 latches the output of latch 48 through AND gate 60, and disables the latch 48 through AND gate 62 until the next sample period. The disable signal 54 also disables the ring oscillator 8 and loads the counters 40 and 44 with appropriate starting values. A register 64 resets the disable signal 54 when clocked by the reference signal 14 to thereby synchronize the ring oscillator 8 and the frequency generator 12.

In one embodiment, the comparator 16 compares one cycle of the oscillator signal 10 to one cycle of the reference signal 14. Because the comparator 16 compares a cycle (or cycles) of the oscillator signal 10 to a cycle (or cycles) of the reference signal 14, as compared to computing a frequency difference using counters, the comparator 16 may in some embodiments reduce the transport delay and quantization error, and thereby improve the transient response of the switching voltage regulator.

The counters 40 and 44 in the embodiment of FIG. 3 enable scaling of the oscillator frequency or the reference frequency. For example, if the frequency of the oscillator signal 10 should equal half the frequency of the reference signal 14, then counter 40 is loaded with a starting value that is twice the starting value loaded into counter 44, from which values the two counters count down at each cycle of the reference and oscillator signals. In another embodiment, the comparator 16 compares multiple cycles of the oscillator signal 10 and reference signal 14 in order to improve the accuracy of the measurement, for example, by compensating for startup transient errors of the ring oscillator 8. For example, in one embodiment, counters 40 and 44 are loaded with a starting value of 2 in order to compare two cycles of the oscillator signal 10 to two cycles of the reference signal 14.

Depending on the speed requirements and circuit tolerances, a number of the components shown in FIG. 3 may be modified or eliminated while still performing the same cycle comparison function. In one embodiment, the counters 40 and 44 are implemented using simple registers for detecting a single cycle of the reference signal 14 and oscillator signal 10, respectively.

Figure 4:
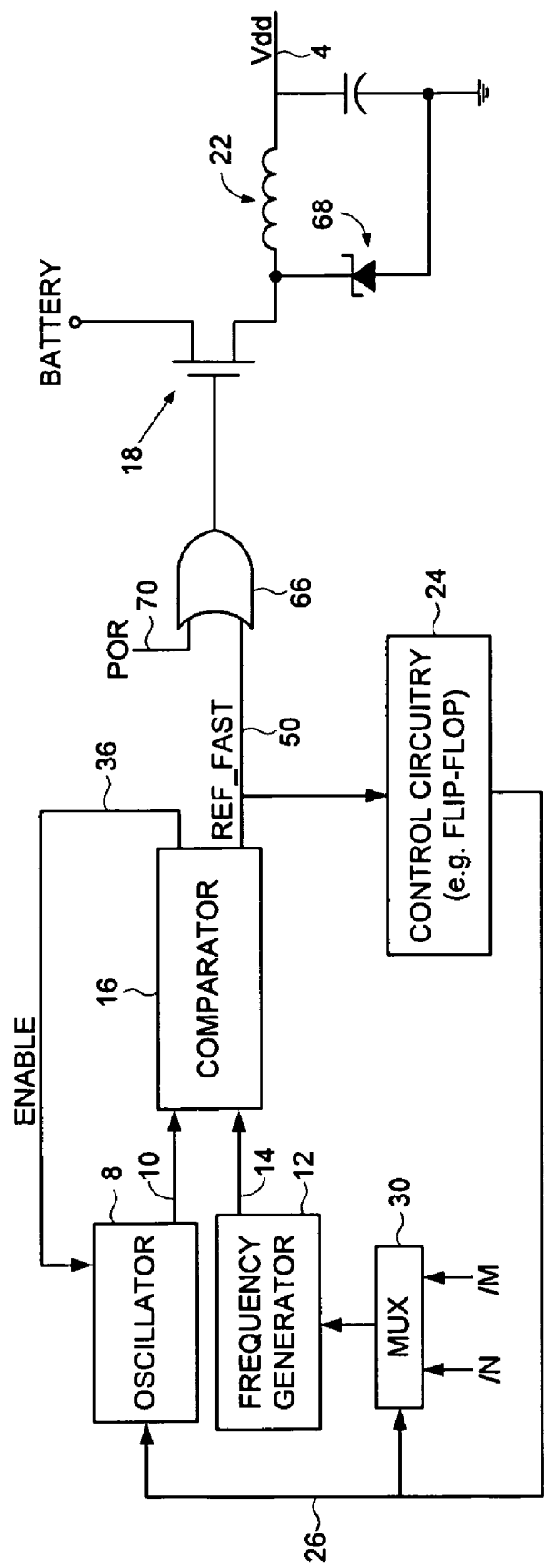
FIG. 4 shows control circuitry according to an embodiment of the present invention wherein the switching circuitry charges the charging element while the reference frequency is above the oscillator frequency.

FIG. 4 shows a switching voltage regulator employing a ring oscillator 8 and comparator 16 according to an embodiment of the present invention. When the REF_FAST signal 50 is active (indicating that the output voltage 4 is too low), it turns on switch 18 through OR gate 66 so as to charge the charging element 22. The REF_FAST signal 50 also toggles flip-flop 24 so as to adjust the divider value of the frequency generator 12 and the number of delay elements in the ring oscillator 8 to effectively raise the threshold in the comparator 16. The switch 18 remains on until the oscillator signal 10 rises above the higher threshold, at which time the REF_FAST signal 50 goes low turning off the switch 18 to stop charging the charging element 22. When the REF_FAST signal 50 goes low, it also toggles flip-flop 24 so as to lower the threshold in the comparator 16, thereby keeping switch 18 off until the oscillator signal 10 falls back below the lower threshold.

The switching voltage regulator of FIG. 4 comprises a diode 68 that enables a recirculation current. In an alternative embodiment, the diode 68 of FIG. 4 is replaced with a conventional switch (e.g., a FET, as shown in FIG. 1) to improve efficiency by avoiding the voltage drop of the diode 68. In one embodiment, a current detector is employed to turn off the switch once the current decays to zero.

In one embodiment, the switching voltage regulator further comprises suitable circuitry to facilitate a startup operation during a power-on restart (POR) event. For example, in the embodiment of FIG. 4, a POR signal 70 enables a charge cycle through OR gate 66 regardless of the discharge level of the current in order to help maintain a sufficient output voltage 4 during the startup operation. Once the switching voltage regulator stabilizes, the POR signal 70 is disabled so that the regulator enters the discontinuous mode.

Figure 5:
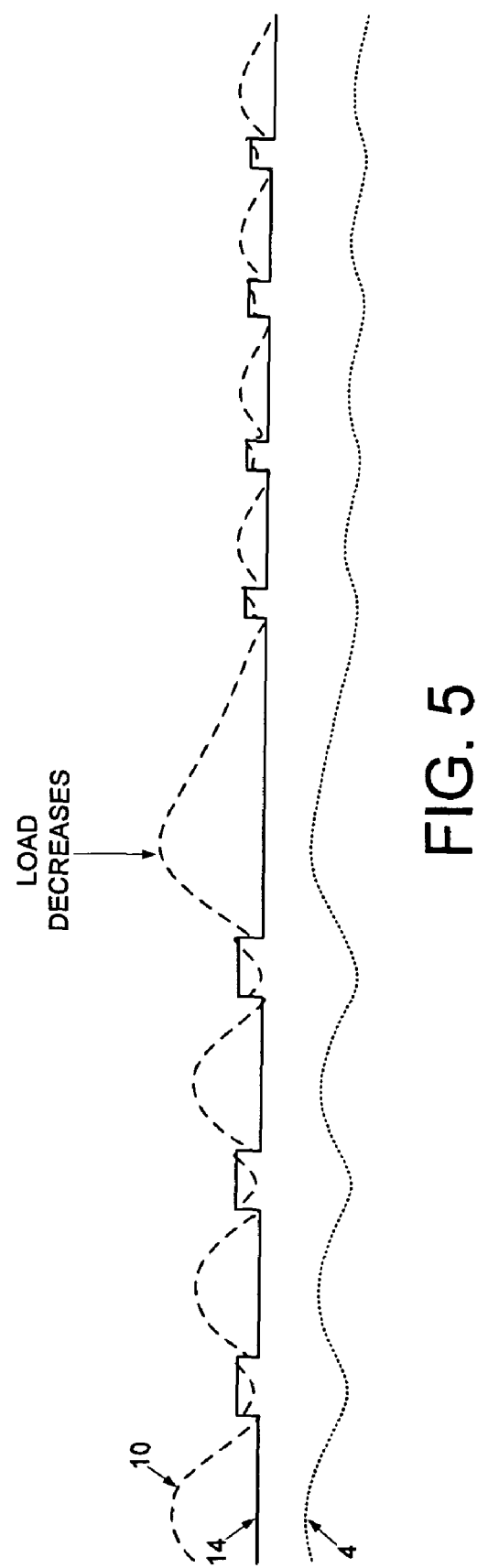
FIG. 5 shows example waveforms illustrating an embodiment of the present invention including the frequency of the oscillator signal, the frequency of the reference signal, and the regulated voltage supplied to the system circuitry.

FIG. 5 shows example waveforms illustrating an embodiment of the present invention including the frequency of the oscillator signal 10, the frequency of the reference signal 14, and the regulated voltage 4 supplied to the system circuitry 6. When the frequency of the oscillator signal 10 falls below the frequency of the reference signal 14, the control circuitry 24 decreases the number of delay elements in the ring oscillator 8 which effectively increases the frequency of the oscillator signal 10 as shown in FIG. 5. At the same time, the control circuitry 24 adjusts the divider value of the frequency generator 12 which increases the frequency of the reference signal 14 to be slightly higher than the frequency of the oscillator signal 10 as illustrated in FIG. 5. This causes the comparator 16 to turn on switch 18 of FIG. 4 to charge the charging element 22 and increase the supply voltage 4. When the frequency of the oscillator signal 10 exceeds the frequency of the reference signal 14, the control circuitry 24 increases the number of delay elements in the ring oscillator 8 which effectively decreases the frequency of the oscillator signal 10 as illustrated in FIG. 5. At the same time, the control circuitry 24 adjusts the divider value of the frequency generator 12 which decreases the frequency of the reference signal 14 to be slightly lower than the frequency of the oscillator signal 10 as illustrated in FIG. 5. This causes the comparator 16 to turn off switch 18 of FIG. 4 which eventually discharges the charging element 22 until the supply voltage 4 decreases to start another cycle. When the load decreases as shown in FIG. 5, the on time of switch 18 decreases which reduces the ripple voltage of the supply voltage 4.

Figure 6:
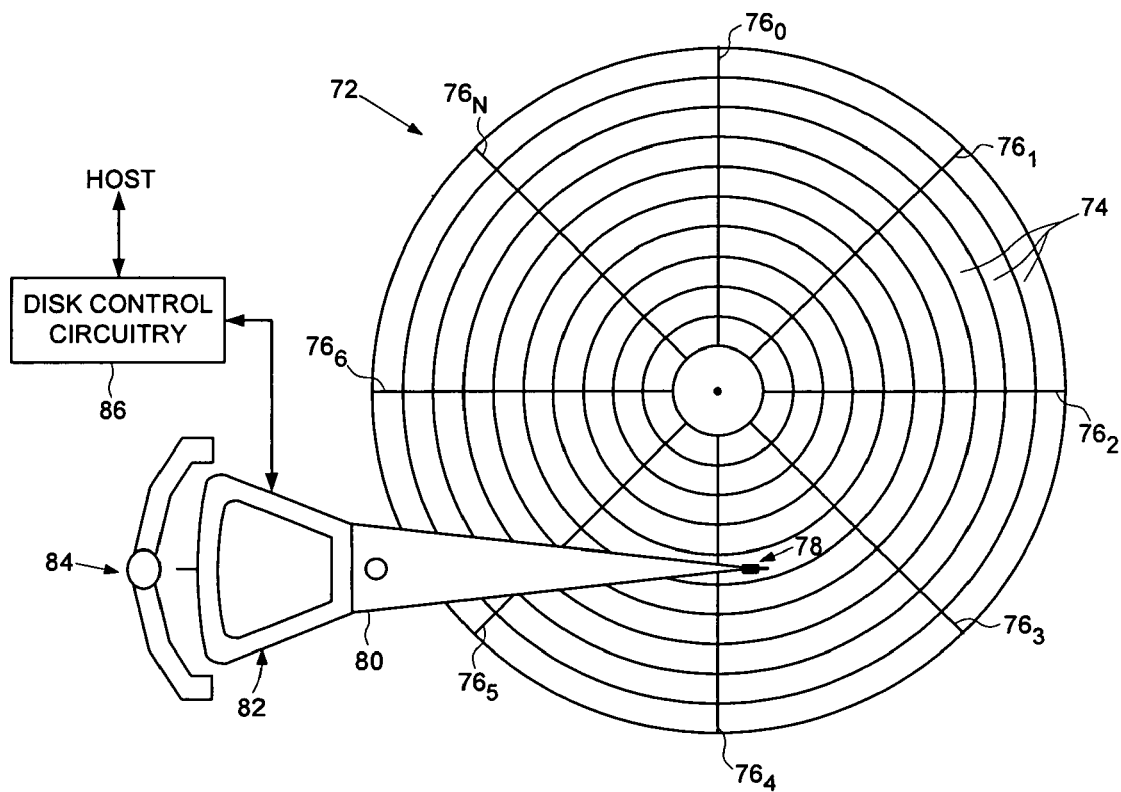
FIG. 6 shows a disk drive including control circuitry employing a switching voltage regulator according to an embodiment of the present invention.

FIG. 6 shows a disk drive according to an embodiment of the present invention comprising a disk 72 having a plurality of data tracks 74 defined by embedded servo sectors 76$_0$-76$_N$. A head 78 is connected to a distal end of an actuator arm 80 which is rotated by a voice coil motor (VCM) about a pivot in order to actuate the head 78 radially over the disk 72 in order to access the data tracks 74. The VCM comprises a voice coil 82 which interacts with permanent magnets (not shown) to generate the rotational torque. A crash stop 84 limits the stroke of the actuator arm 80 to protect the head 78. The disk drive further comprises disk control circuitry 86 including the switching voltage regulator 2 of FIG. 1 for generating a supply voltage 4 applied to a reference circuit within the disk control circuitry 86.

Any suitable disk control circuitry may be employed to implement the flow diagrams in the embodiments of the present invention, such as any suitable integrated circuit or circuits. For example, the disk control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the disk control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the disk control circuitry comprises suitable logic circuitry, such as state machine circuitry.

The switching voltage regulator 2 may be employed in any suitable storage device other than a disk drive, such as in a flash based storage device. The switching voltage regulator 2 may also be employed in any suitable consumer or industrial electronic device other than storage devices. For example, the switching voltage regulator 2 may be employed in system circuitry for computers, cell phones, televisions, music players, or any other suitable device.

What is claimed is:

1. A switching voltage regulator operable to regulate a voltage supplied to system circuitry, the switching voltage regulator comprising:
    a ring oscillator operable to generate an oscillator signal representing a gate speed of a reference circuit in the system circuitry, wherein the ring oscillator comprises a plurality of delay elements connected in series;
    a frequency generator operable to generate a reference signal representing a target gate speed of the reference circuit, wherein a frequency of the reference signal is based on a divider value;
    a comparator operable to compare the oscillator signal to the reference signal;
    switching circuitry operable to charge a charging element in response to the comparison; and
    control circuitry operable to adjust the number of delay elements in the ring oscillator and the divider value of the frequency generator to generate hysteresis in the comparison.

2. The switching voltage regulator as recited in claim 1, wherein the control circuitry comprises a flip-flop.

3. The switching voltage regulator as recited in claim 1, wherein the control circuitry is further operable to select between a first number of delay elements and a second number of delay elements and select between a first divider value and a second divider value.

4. The switching voltage regulator as recited in claim 3, wherein the control circuitry is further operable to toggle between a first number of delay elements and a second number of delay elements and toggle between a first divider value and a second divider value.

5. The switching voltage regulator as recited in claim 4, wherein the control circuitry is further operable to toggle between the first divider value and the second divider value and toggle between the first number of delay elements and the second number of delay elements when a frequency of the oscillator signal falls below a frequency of the reference signal.

6. The switching voltage regulator as recited in claim 1, wherein the control circuitry comprises a first multiplexer for selecting one of a plurality of delay elements and a second multiplexer for selecting one of a plurality of divider values.

7. The switching voltage regulator as recited in claim 3, wherein:
    the second number of delay elements effectively divides a frequency of the oscillator signal by a third divider value; and
    the second divider value is different from the third divider value, thereby generating a hysteretic threshold in the comparison.

8. The switching voltage regulator as recited in claim 1, wherein the switching circuitry is operable to charge the charging element while a frequency of the reference signal is above a frequency of the oscillator signal.

9. A method of operating a switching voltage regulator operable to regulate a voltage supplied to system circuitry, the switching voltage regulator comprising:
    a ring oscillator operable to generate an oscillator signal representing a gate speed of a reference circuit in the system circuitry, wherein the ring oscillator comprises a plurality of delay elements connected in series; and a frequency generator operable to generate a reference signal representing a target gate speed of the reference circuit, wherein a frequency of the reference signal is based on a divider value;

the method comprising:
comparing the oscillator signal to the reference signal;
charging a charging element in response to the comparison; and
adjusting the number of delay elements in the ring oscillator and the divider value of the frequency generator to generate hysteresis in the comparison.

10. The method as recited in claim 9, further comprising selecting between a first number of delay elements and a second number of delay elements and selecting between a first divider value and a second divider value.

11. The method as recited in claim 10, further comprising toggling between a first number of delay elements and a second number of delay elements and toggling between a first divider value and a second divider value.

12. The method as recited in claim 11, further comprising toggling between the first divider value and the second divider value and toggling between the first number of delay elements and the second number of delay elements when a frequency of the oscillator signal falls below a frequency of the reference signal.

13. The method as recited in claim 9, further comprising selecting one of a plurality of delay elements and selecting one of a plurality of divider values.

14. The method as recited in claim 10, wherein:
the second number of delay elements effectively divides a frequency of the oscillator signal by a third divider value; and
the second divider value is different from the third divider value, thereby generating a hysteretic threshold in the comparison.

15. The method as recited in claim 9, further comprising charging the charging element while a frequency of the reference signal is above a frequency of the oscillator signal.

16. A disk drive comprising:
a disk;
a head actuated over the disk; and
disk control circuitry including a switching voltage regulator comprising:
a ring oscillator operable to generate an oscillator signal representing a gate speed of a reference circuit in the disk control circuitry, wherein the ring oscillator comprises a plurality of delay elements connected in series;
a frequency generator operable to generate a reference signal representing a target gate speed of the reference circuit, wherein a frequency of the reference signal is based on a divider value;
a comparator operable to compare the oscillator signal to the reference signal;
switching circuitry operable to charge a charging element in response to the comparison; and
control circuitry operable to adjust the number of delay elements in the ring oscillator and the divider value of the frequency generator to generate hysteresis in the comparison.

* * * * *